United States Patent
Sexton et al.

(10) Patent No.: US 10,358,209 B2
(45) Date of Patent: Jul. 23, 2019

(54) BRAKE ROD ASSEMBLY

(71) Applicant: SAFRAN LANDING SYSTEMS UK LTD, Gloucester, Gloucestershire (GB)

(72) Inventors: Matthew Sexton, Gloucester (GB); Robert Kyle Schmidt, Gloucester (GB); Thomas Halford, Gloucester (GB)

(73) Assignee: SAFRAN LANDING SYSTEMS UK LTD, Gloucestershire (GB)

( * ) Notice: Subject to any disclaimer, the term of this patent is extended or adjusted under 35 U.S.C. 154(b) by 73 days.

(21) Appl. No.: 15/067,963

(22) Filed: Mar. 11, 2016

(65) Prior Publication Data

US 2016/0264235 A1 Sep. 15, 2016

(30) Foreign Application Priority Data

Mar. 12, 2015 (EP) .................................... 15158827

(51) Int. Cl.
*B64C 25/44* (2006.01)
*B64C 25/42* (2006.01)

(52) U.S. Cl.
CPC .............. *B64C 25/44* (2013.01); *B64C 25/42* (2013.01)

(58) Field of Classification Search
CPC ......... B64C 25/34; B64C 25/42; B64C 25/32; B64C 25/426; B64C 25/44; B64C 25/46; B64C 2025/345; F16D 2055/0008; F16D 55/36; F16D 65/0056
See application file for complete search history.

(56) References Cited

U.S. PATENT DOCUMENTS

| | | | | |
|---|---|---|---|---|
| 2,578,200 A | * | 12/1951 | Nicholl | B64C 25/44 188/2 R |
| 2,792,998 A | * | 5/1957 | Dowty | B64C 25/44 188/152 |
| 2,842,326 A | * | 7/1958 | Sharples | B64C 25/34 244/103 R |
| 2,904,136 A | * | 9/1959 | Greenough | B64C 25/46 188/181 A |
| 3,845,919 A | * | 11/1974 | Jenny | B64C 25/34 188/129 |
| 4,296,897 A | * | 10/1981 | Thompson | B60T 11/34 188/181 T |
| 5,746,394 A | | 5/1998 | Gunnoe et al. | |
| 6,149,100 A | | 11/2000 | Ralph | |

(Continued)

FOREIGN PATENT DOCUMENTS

EP 1839984 10/2007

OTHER PUBLICATIONS

English language European Search Report for Application No. EP 15158827, dated Aug. 13, 2015, 4 pages.

*Primary Examiner* — Bradley T King
*Assistant Examiner* — Stephen M Bowes
(74) *Attorney, Agent, or Firm* — RatnerPrestia

(57) ABSTRACT

A brake rod assembly for an aircraft landing gear. The brake rod assembly includes a support member, a first brake rod having a first pivot point and a second pivot point, and a second brake rod. The support member is coupled to the first pivot point, the second brake rod is coupled to the second pivot point, and the first and second pivot points are longitudinally spaced apart along a first portion of the first brake rod.

7 Claims, 4 Drawing Sheets

(56) References Cited

U.S. PATENT DOCUMENTS

2007/0158496 A1* 7/2007 Yourkowski ............ B64C 25/34
                                                         244/102 R
2007/0228825 A1   10/2007 Perriard et al.
2013/0068884 A1*  3/2013 Ducos ..................... B64C 25/10
                                                         244/102 A
2014/0084108 A1*  3/2014 Goodburn ............... B64C 25/34
                                                         244/100 R

* cited by examiner

BRAKE ROD ASSEMBLY

This Application claims the benefit of and priority to European Application 15158827.4, filed Mar. 12, 2015, which is incorporated herein by reference.

BACKGROUND OF THE INVENTION

Aircraft landing gear typically include wheel and brake assemblies in which the torque applied to elements of the brake during braking is reacted against by one or more brake rod assemblies. This reaction prevents the brake assemblies from co-rotating with the wheel when the brake is engaged. The brake rods typically connect between a point on the brake assembly and an anchor point on the landing gear, such as the shock strut or bogie beam.

The brake rod assembly must be capable of withstanding the forces produced during braking. In addition, the mass and size of the assembly should preferably be minimized to achieve a correspondingly low mass and size for the overall aircraft. The connection between the brake rods and the anchor point can experience a large bending moment and is thus a potential point of failure. The connection point can also increase the lateral space envelope of the assembly.

U.S. Pat. No. 5,746,394 describes adjacent wheel brake assemblies on an aircraft multi-wheel landing gear which are interconnected by a ring spring damped brake rod for torque compensation and to provide the added function of vibration damping.

Accordingly there is a need for an improved brake rod assembly for aircraft landing gear.

SUMMARY OF THE INVENTION

According to a first aspect of the present invention, there is provided a brake rod assembly for an aircraft landing gear, the brake rod assembly comprising a shock absorbing strut, a first brake rod comprising a first pivot point and a second pivot point, and a second brake rod, characterised in that the shock absorbing is coupled to the first pivot point and the second brake rod is coupled to the second pivot point, and the first and second pivot points are longitudinally spaced apart along a first portion of the first brake rod. This allows both brake rods to transmit the brake reaction forces to a single pivot point on the support member and reduces the space envelope of the brake rod assembly.

The first portion of the first brake rod may be non-parallel with the remainder of the first brake rod. The second pivot point may be one of a pin joint, a clevis joint, a knuckle joint, or a universal joint. The rotation axes of the first pivot point and the second pivot point may be parallel, or may be non-parallel.

According to a second aspect of the present invention, there is provided an aircraft landing gear including at least one of the brake rod assemblies of the first aspect.

According to a third aspect of the present invention, there is provided an aircraft including at least one aircraft landing gear according to the second aspect.

These and other aspects of the present invention will become apparent from, and clarified with reference to, the embodiments described herein.

BRIEF DESCRIPTION OF THE DRAWINGS

Embodiments of the present invention will now be described, by way of example only, with reference to the accompanying drawings, in which.

DESCRIPTION OF EMBODIMENTS OF THE INVENTION

Figure 1:
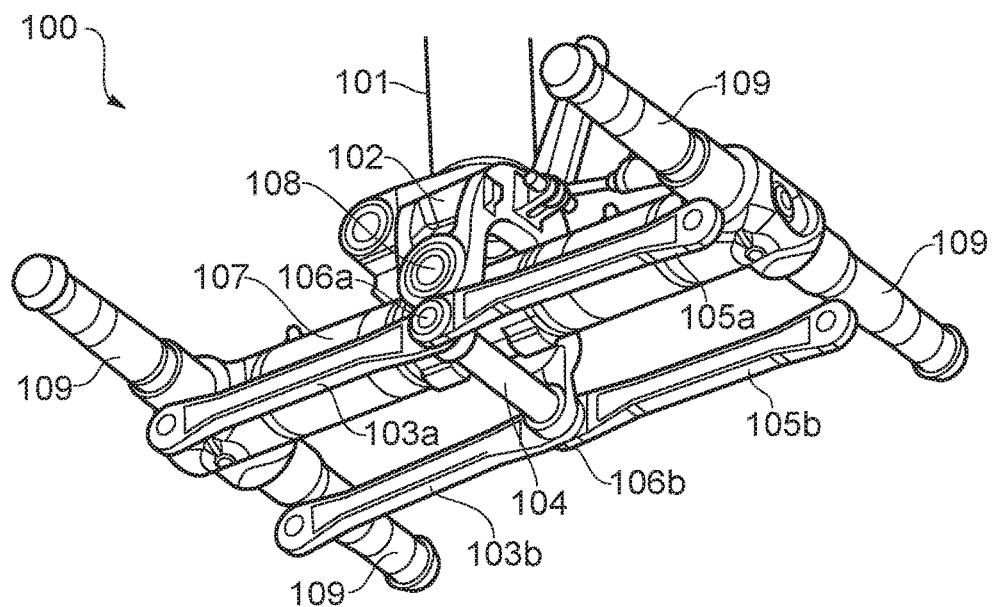
FIG. 1 shows a prior art aircraft landing gear.

FIG. 1 shows a prior art landing gear 100. The landing gear 100 has a main shock absorbing strut 101, at the lower end of which is a strut yoke 102. A bogie beam 107 is rotatably connected to the strut yoke 102 at pivot point 108. Brake assemblies and wheels (not shown) are connected via axles 109 to the bogie beam 107.

On a first side of the landing gear 100, the strut yoke 102 is rotatably coupled to a first brake rod 103a and a second brake rod 105a at a first pivot point 106a, via a pin 104. The ends of brake rods 103a and 105a not coupled to pivot point 106a are coupled to the brake assemblies (not shown). On a second side of the landing gear 100, the strut yoke 102 is rotatably coupled to a third brake rod 103b and a fourth brake rod 105b at a second pivot point 106b via the pin 104.

As can be seen from FIG. 1, the first and second rods 103a and 105a are both coupled to the strut yoke 102 at the same pivot point 106a. As the ends of the first and second brake rods 103a and 105a are coupled to the same pin 104 on the strut yoke 102 they are laterally offset with respect to one another along the pivot pin 104. This configuration means that the first brake rod 105a is a greater lateral distance from the strut yoke 102 than the second brake rod 103a. This causes an asymmetry between the lateral positioning of brake rods 103a and 105a, which may be undesirable for their connection to the brake assemblies. Furthermore, the greater lateral distance of the first brake rod 105a from strut yoke 102 may cause a greater bending moment on the pivot pin 104, and may increase the lateral space envelope of this region of landing gear 100.

Figure 2:
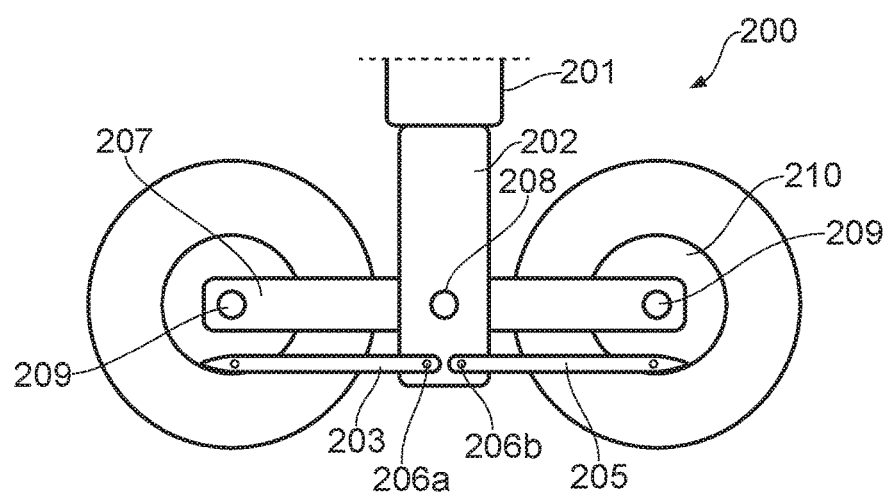
FIG. 2 shows a side view of a second prior art aircraft landing gear.

FIG. 2 shows a side view of a second prior art aircraft landing gear 200. The landing gear 200 has a main shock absorbing strut 201, at the lower end of which is a strut yoke 202. A bogie beam 207 is rotatably connected to the strut yoke 202 at a pivot point 208 and supports axles 209. Brake assemblies 210 and wheels (not shown) are carried by the axles 209. The strut yoke 202 is rotatably coupled to a first brake rod 203 at a first pivot point 206a. The opposite end of the first brake rod 203 from the end coupled at pivot point 206a is coupled to a brake assembly (not shown). The strut yoke 202 is also rotatably coupled to a second brake rod 205 at a second pivot point 206b. The opposite end of the second brake rod 205 from the end coupled at pivot point 206b is coupled to the brake assembly 210. The first and second pivot points 206a and 206b may comprise pin joints. An analogous arrangement of brake rods, pivot points and brake assemblies is present on the opposite side of the landing gear 200 (side not shown), involving third and fourth brake rods. The presence of two separate joints 206a and 206b may cause the lower extremity of strut yoke 202 to be structurally weakened. To counteract this weakness, strut yoke 202 may be reinforced with extra material, disadvantageously increasing its mass.

Figure 3A:
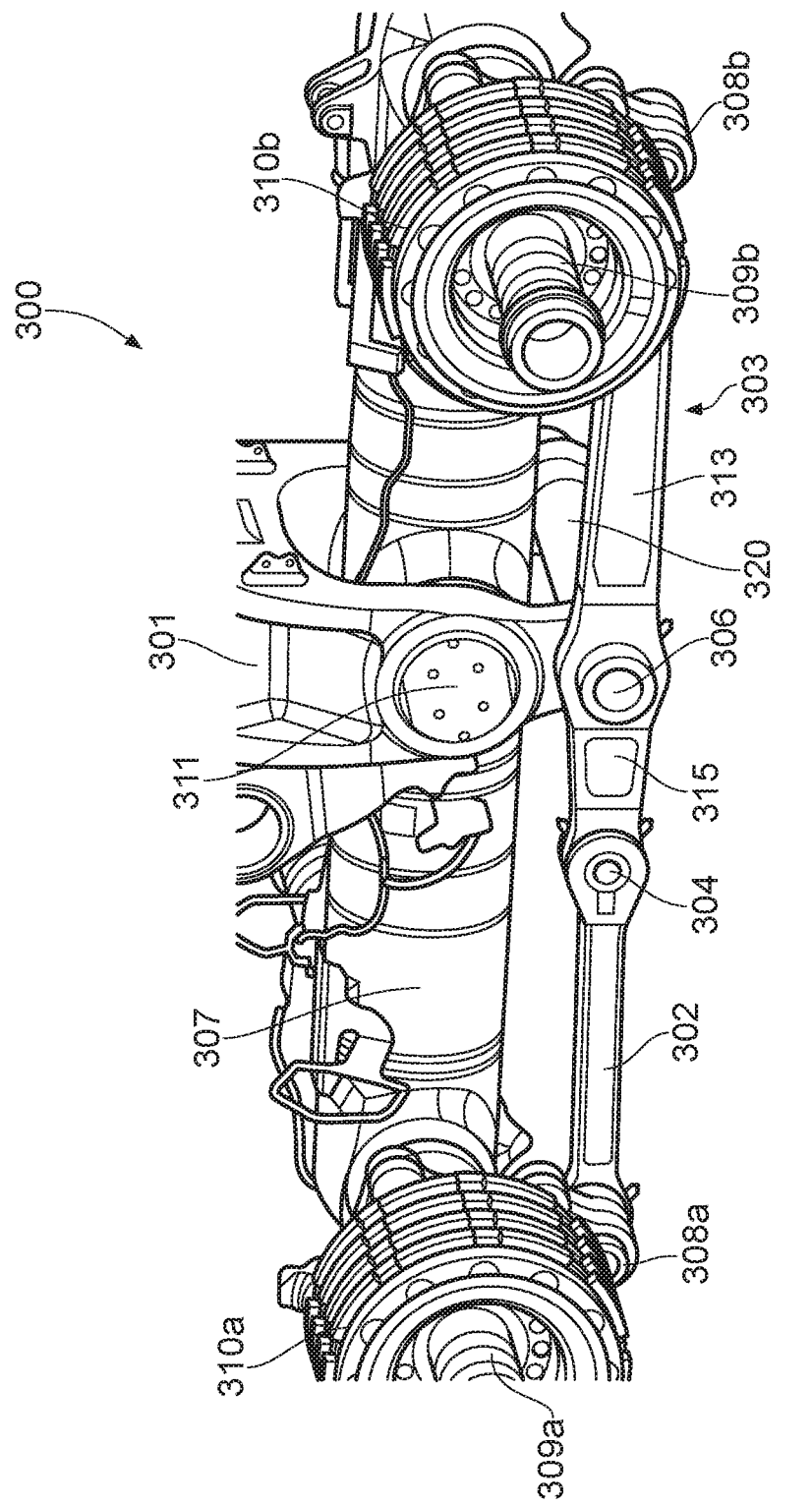
FIG. 3A shows a partial side view of an aircraft landing gear according to an embodiment of the present invention.
Figure 3B:
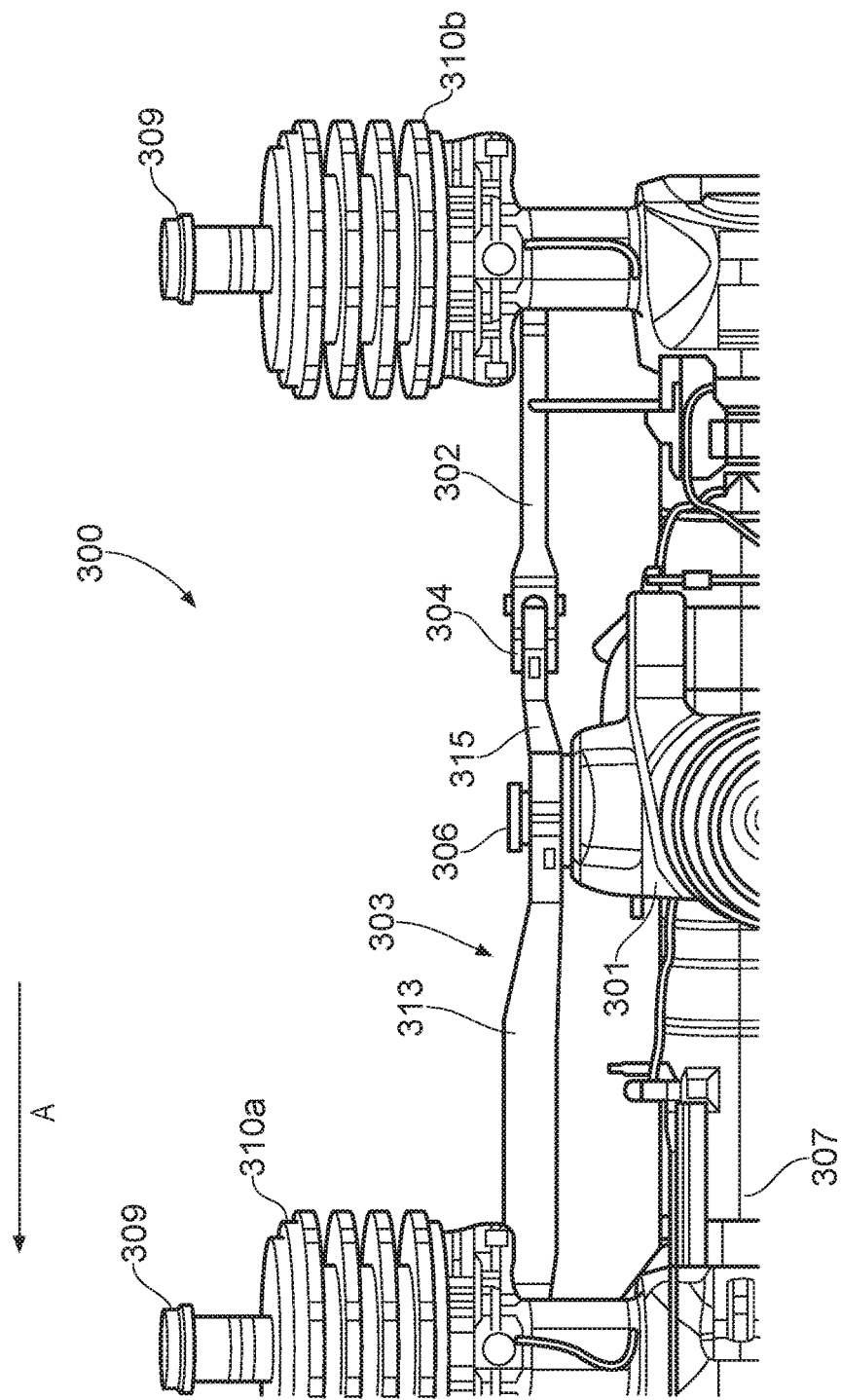
FIG. 3B shows a partial top view of the aircraft landing gear shown in FIG. 3A.

FIGS. 3A and 3B show a partial side view and a partial top view of an aircraft landing gear 300 according to an embodiment of the present invention. Strut yoke 301 is mounted at the lower end of a shock strut (not shown) and is rotatably connected to bogie beam 307 at pivot point 311. A first brake rod 303 is rotatably coupled to the strut yoke 301 at a first pivot point 306 and coupled to a first brake assembly 310*b* at a first fixing point 308*b*. Brake assembly 310*b* is carried by axle 309*b* which attaches to bogie beam 307. The first pivot point 306 of the first brake rod 303 is located between a first portion 313 and second portion 315 of the first brake rod. The first fixing point 308*b* of the brake rod is located at the free end of the first portion 313. The second portion 315 of the first brake rod 303 terminates in a second pivot point 304 which is linearly spaced apart from the first pivot point 306 by a second portion 315 of the first brake rod 303. A second brake rod 302 is rotatably coupled to the first brake rod (303) at the second pivot point 304 and coupled to a second brake assembly 310*a* at a second fixing point 308*a*. Brake assembly 310*a* is carried by axle 309*a*, which attaches to bogie beam 307. An analogous arrangement comprising a second pair of brake rods and brake assemblies exists on the opposite side of the landing gear 300.

The first pivot point 306 is preferably a pin joint, sharing a joint pin 320 with the corresponding pivot point on the opposite side of landing gear 300. The second pivot point 304 is preferably a clevis joint, and the rotation axes of pivot points 304 and 306 are parallel. In some embodiments, the first pivot point 306 may couple the first brake rod to the bogie beam 307 or to the shock strut, rather than to the strut yoke 301. In some embodiments the second pivot point 304 may be one of a pin joint, a knuckle joint, or a universal joint.

In use, with the aircraft travelling in the direction of arrow A, the brake assemblies 310*a* and 310*b* may be activated so as to apply a braking force to the wheel assemblies (not shown). The first brake rod 303 and second brake rod 302 are arranged to react against brake torque during braking. The brake torque from the first brake assembly 310*b* results in the first brake rod 303 experiencing a tensile force as it reacts to the brake torque. The brake torque from the second brake assembly 310*a* results in the second brake rod 302 experiencing a compression force as it reacts to the brake torque.

In other embodiments of the present invention, one or both of the brake rods may be coupled to the brake assemblies in a different configuration, so as to experience the opposite sense force (tension or compression) when reacting the brake torque. The configuration of such brake assembly couplings is well known to persons skilled in the art.

Embodiments of the present invention provide a single anchor point on the landing gear to which both brake rods (directly and indirectly) transmit their load. This simplifies the design of the anchor point compared to cases where two such points are required (as shown in FIG. 2). An "anchor point" can be any suitable location on the landing gear to which a brake rod can be attached such that it can react a brake torque so as to stabilise the position of a brake assembly. Furthermore, in embodiments of the present invention, the lateral width of the brake rod assembly is equal to the width of an individual brake rod. This width is less than in designs where the two brake rods overlap at the pivot point (such as shown in FIG. 1), causing the assembly to have twice the width of an individual brake rod. Embodiments of the present invention therefore exhibit an advantageous reduction in the lateral space envelope of the brake rod assembly. In the overlapping designs (e.g. landing gear 100) the outer brake rod is rotatably attached to the joint pin at a greater distance from the strut yoke than in embodiments of the present invention (e.g. landing gear 300). This means that, for an equal tension or compression force in the brake rod, the joint pin at pivot point 306 experiences a smaller bending moment than the joint pin at pivot point 106*a*. A smaller bending moment is advantageous for reducing the probability of failure of the components or, alternatively, for reducing the size of the components (while maintaining constant failure probability).

FIGS. 4A-4D show partial schematic views of four brake rod pairs according to embodiments of the present invention. In each figure, the ends of the brake rods intended to be coupled to the brake assemblies have been omitted. Each of FIGS. 4A-4D show a first brake rod 403 and a second brake rod 402, corresponding to brake rods 303 and 302 in landing gear 300 shown in FIGS. 3A and 3B. In the brake rod assembly of FIGS. 4A-4D, the first brake rod 403 comprises a first pivot point 406 for rotatable attachment to a support member on the landing gear. The first pivot point 406 is located part of the distance along the first brake rod, dividing it into a first portion 413 and a second portion 415. The first brake rod (403, 405) may however be composed of a single piece of material, or be a composite object. The first brake rod is rotatably coupled to the second brake rod 402 at a second pivot point 404, which may, for example, be a clevis joint or a pin joint.

Figure 4A:
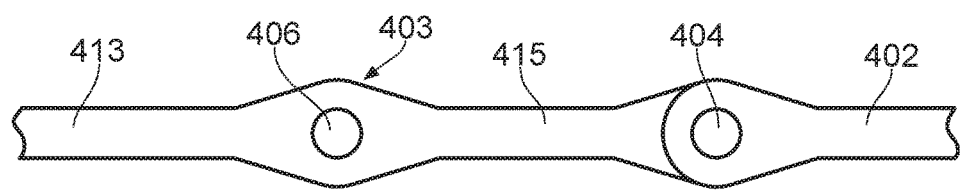
FIGS. 4A, 4B, 4C, and 4D show partial schematic views of four brake rod pairs according to embodiments of the present invention.

FIGS. 4A-4D show four variations corresponding to embodiments of the present invention. FIG. 4A shows both brake rods as linear members and both pivot points having parallel rotation axes.

Figure 4B:
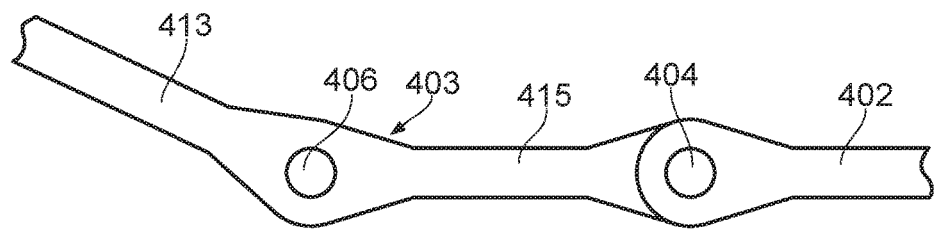

FIG. 4B shows an embodiment of the present invention where the first portion 413 and second portion 415 of the first brake rod are not parallel. This may be advantageous in some brake configurations in order to transmit the forces more effectively.

Figure 4C:
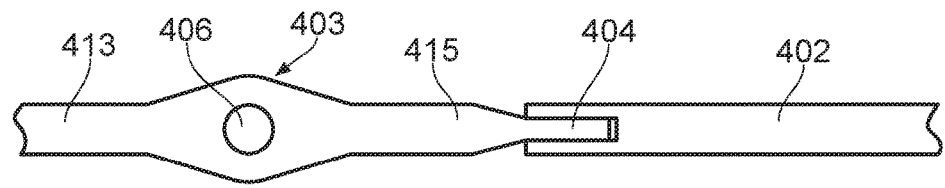

FIG. 4C shows an embodiment of the present invention where the rotation axis of the second pivot point 404 is not parallel to the rotation axis of the first pivot point 406. The angle between the two axes is shown as 90 degrees but any other angle may be chosen to suit the particular geometry. This may be advantageous in some brake configurations where the first pivot point 406 is coupled to a support member such that its rotation axis is not parallel to the landing gear wheel axles.

Figure 4D:
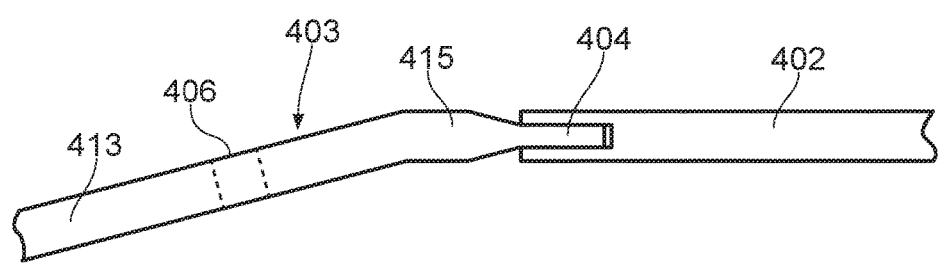

FIG. 4D shows an embodiment of the present invention where the second portion 415 of the first brake rod is not linear. In this embodiment the two pivot points have rotation axes that are non-parallel but co-planar. In other embodiments, the second brake rod 402, or the first portion 413 of the first brake rod may alternatively, or in addition, be non-linear. The non-linearity of one or both of the brake rods may be advantageous in landing gear designs where the anchor point for coupling to the support member, and the two brake assembly fixing points are not co-linear.

Each of the distinguishing characteristics of the brake rod pairs shown in FIGS. 4A-4D may also be combined with any of the others.

Although the landing gears of the illustrated embodiments show two axles on each side of the landing gear, more than two axles may be provided in other embodiments. Furthermore, one or more wheel and brake assemblies may be provided on each axle, and a brake rod assembly according to the present invention may be coupled to each brake assembly.

The invention claimed is:

1. A brake rod assembly for an aircraft landing gear, the brake rod assembly comprising:
   a bogie beam rotatably connected to a shock absorbing strut;
   a first brake assembly coupled to the bogie beam at a first end of the bogie beam;
   a second brake assembly coupled to the bogie beam at a second end of the bogie beam;
   a first brake rod comprising a first pivot point located between a second pivot point at a first end of the first brake rod and a first brake fixing point at a second end of the first brake rod, the first brake rod being coupled to the shock absorbing strut at the first pivot point and coupled to the first brake assembly at the first brake fixing point; and
   a second brake rod coupled at a first end thereof to the first brake rod at the second pivot point and coupled at a second end thereof to the second brake assembly.

2. The brake rod assembly according to claim 1 wherein the second pivot point is laterally offset from the first pivot point.

3. The brake rod assembly according to claim 1 wherein the second pivot point is one of a pin joint, a clevis joint, a knuckle joint, or a universal joint.

4. The brake rod assembly according to claim 1 wherein the rotation axes of the first pivot point and the second pivot point are parallel.

5. The brake rod assembly according to claim 1 wherein the rotation axes of the first pivot point and the second pivot point are not parallel.

6. An aircraft landing gear including at least one brake rod assembly according to claim 1.

7. An aircraft including at least one aircraft landing gear according to claim 6.

* * * * *